Sept. 10, 1968
P. E. TOBIAS
3,400,925
PHOTOCOMPOSITION CORRECTOR
Filed March 10, 1966
2 Sheets-Sheet 1
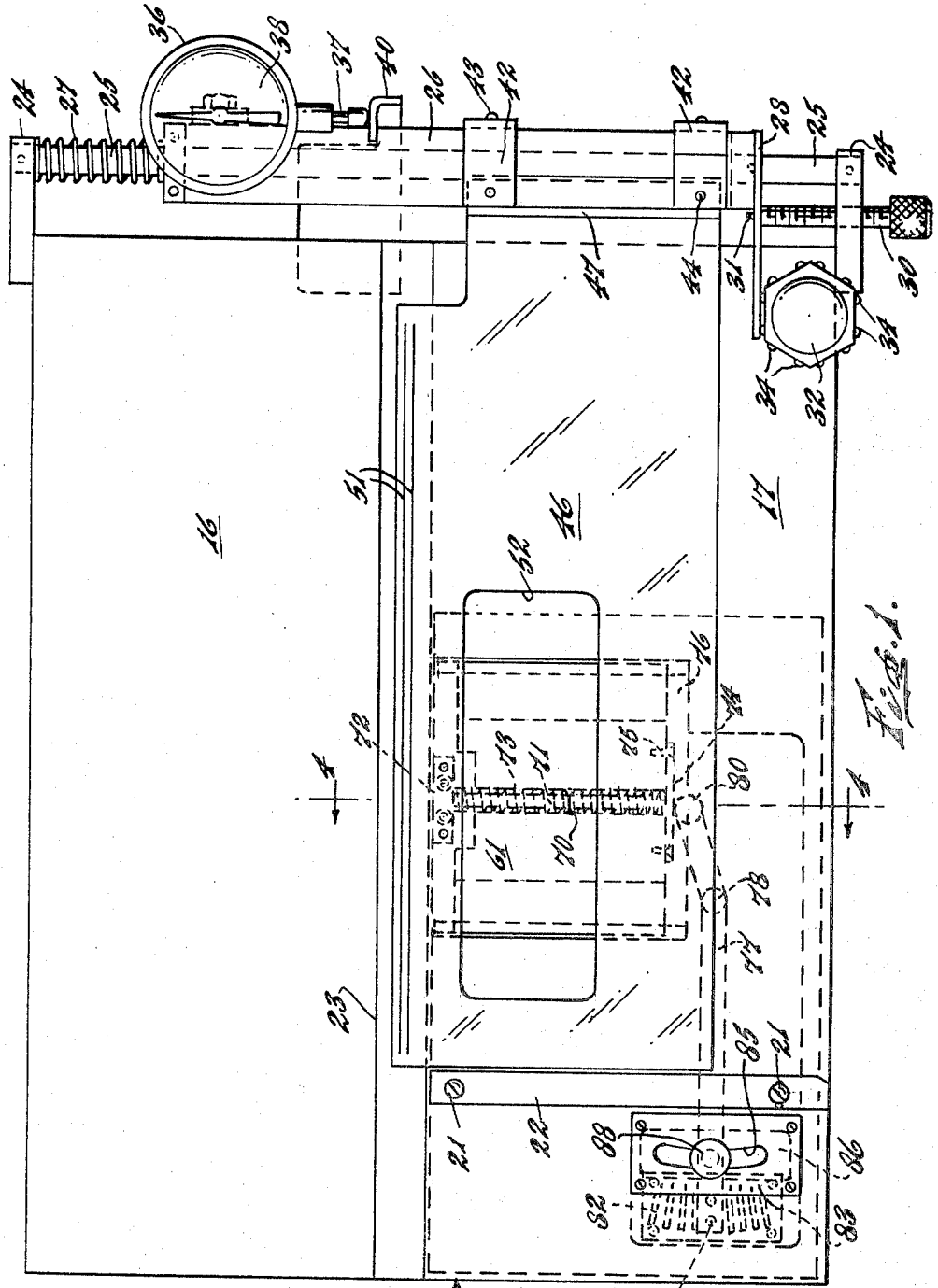
INVENTOR.
Philip E. Tobias
BY
ATTORNEYS

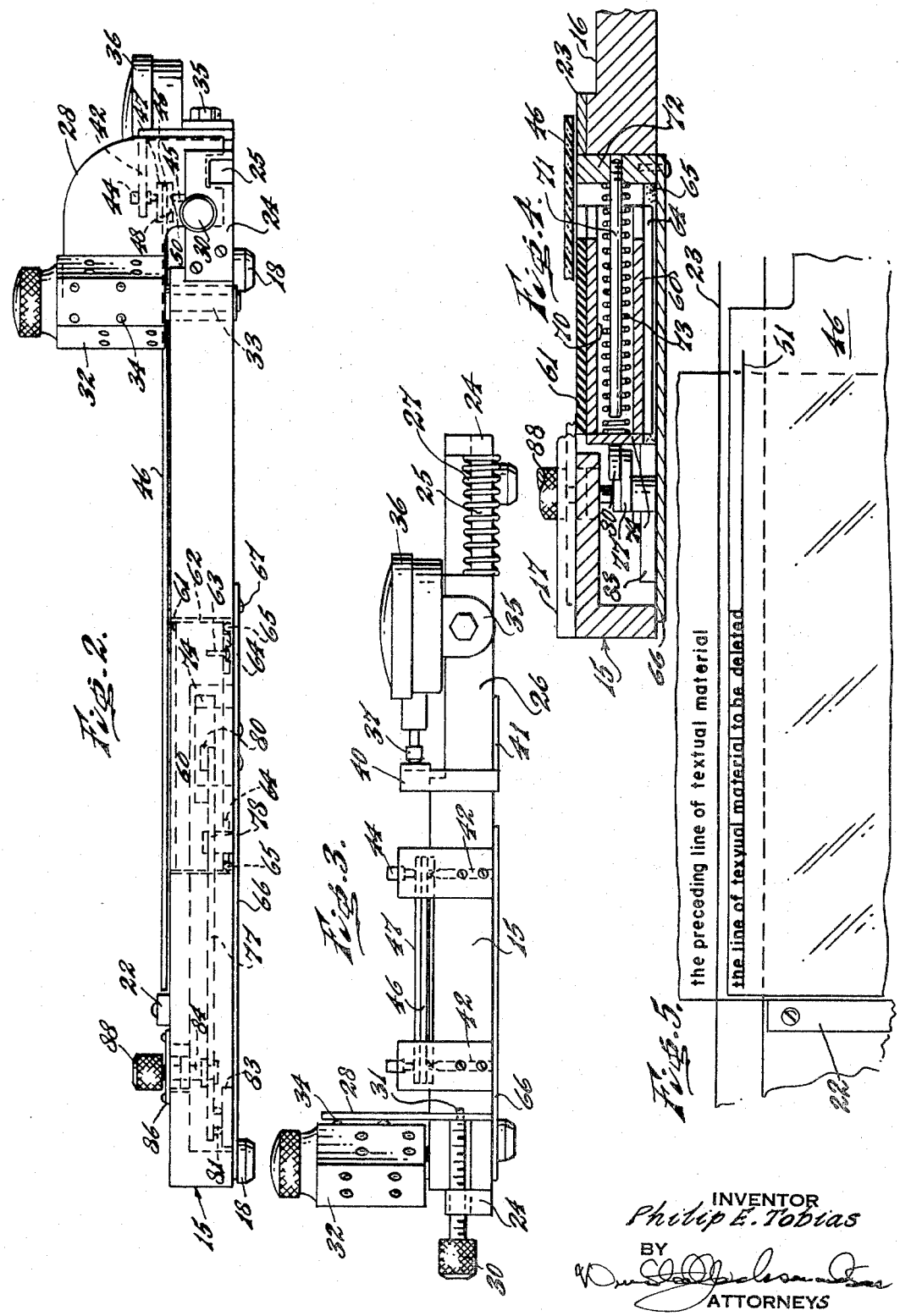

United States Patent Office 3,400,925
Patented Sept. 10, 1968

3,400,925
PHOTOCOMPOSITION CORRECTOR
Philip E. Tobias, 1872 Watson Road,
Abington, Pa. 19001
Filed Mar. 10, 1966, Ser. No. 533,194
8 Claims. (Cl. 269—293)

ABSTRACT OF THE DISCLOSURE

The invention relates to a workholder for making photocomposition corrections in transparent work having textual material arranged in lines, each of which has a reference or base line, which workholder includes a base for supporting the work, a shear line on the base on which shearing can be conducted, a transparent indexing plate on the base, means for mounting the indexing plate slidably toward the shear line, an index line on the surface of the indexing plate adjoining the base and a micrometer mounting on the base and accurately adjusting the relative distance between the indexing line and the shear line. A carriage slidable with respect to the base advances work toward the shear line.

Description of invention

This invention relates to a device for correcting photocompositions, and more particularly, to a device for correcting textual material set on either a film or paper base.

Photocomposition is intended to include opaque or transparent films having set thereon photographically a series of lines of textual material or other similar indicia, the films being suitable after processing for use in the making of printing plates. Invariably, changes are required in the film base as a result of editing processes, revisions, corrections and the like. One approach is to recompose the entire copy, with the inherent disadvantage that further errors may occur in the recomposition of the same, and the approach is time-consuming and expensive. A more practical approach is to physically remove the undesired line or lines of textual material by cutting it away from the body of the copy and then replacing it with a corrected line on a similar-shaped piece of film suitably secured to the body of the copy. This procedure involves great care and skill, and one inherent problem is the fact that the cut lines made in the copy may not match with the edges of the new section to be inserted. In order to make these edges meet, it is necessary to cut precisely at right angles to and exactly between adjacent lines of textual material. The cut edges of the film must abut against each other in order to prevent exposure of the securing means used on the back of the film to secure the corrected line to the body of the copy and to give greater rigidity to the finally-corrected copy and to provide the proper interline spacing.

Punch and die sets have been utilized in the past to remove incorrect lines of copy. While a straight cut line is achieved, a multitude of die sets must be provided in order to be able to correct all sizes of textual material, and in addition, dulling of the punch and dies requires periodically rather expensive sharpening procedures.

It is, therefore, an object of this invention to provide a mechanism that accurately deletes a line of incorrect textual material by cutting precisely between and parallel to the lines of material, that is flexible for use with all sizes of textual material, that is greatly simplified in construction and that is inexpensive and easy to operate.

A further object of this invention is to provide a photocomposition corrector having an index line alignable with the reference line of the textual material and spaced a calculated distance from a cutting edge, thereby permitting the film to be cut precisely parallel to and between the lines of textual material.

A further object of this invention is to provide a photocomposition corrector in which there is provision for moving the index line toward and away from a fixed cutting edge to adjust the relative distance between the cutting edge and the reference line of the textual material.

A further object of this invention is to provide a selector for automatically positioning the index line a preselected distance away from the cutting edge, the distance being selected according to the size of the textual material to be corrected.

A further object of this invention is to provide a means for advancing the copy of textual material perpendicular to and toward the cutting line, after an initial cut is made in the work, a calculated distance to enable a subsequent cut to be made in the copy, thereby allowing the removal of an entire line or lines of textual material.

A further object of this invention is to provide a locating means for automatically limiting the range of movement of the copy between the initial and subsequent cuts, the amount of movement corresponding to the desired width of the cut to be made.

Additional objects will become more apparent from the following description of the drawings:

FIGURE 1 is a plan view of the photocomposition corrector.

FIGURE 2 is a front elevation of the device as shown in FIGURE 1.

FIGURE 3 is a side elevation of the device as shown in FIGURE 1.

FIGURE 4 is a sectional view of the platform taken along the lines 4—4 of FIGURE 1.

FIGURE 5 is a fragmentary view showing the relationship between the copy to be corrected, the cutting edge and the index line.

In a conventional line of typewritten textual material, the line is composed of characters having ascending portions like the letter "d," descending portions like the letter "g," and characters with no extending portions like the letter "w." It is important that the cut lines fall exactly parallel to the lines of type and preferably half way between the descenders of the characters on an upper line and the ascenders of the characters on a lower line, although the cut line may be made more toward one line or the other. The essential factor, however, is that the cut be made between the lines of type so as not to remove any portions of ascending or descending characters.

The mechanism of this invention has provided a means for accurately and easily cutting a film of photo-composition exactly between lines of type so that a new strip having the desired textual material thereon can be accurately substituted for the one removed. The objects of this invention have been accomplished by locating the cutting edge with respect to an index line that is aligned with a reference line of the type matter textual material. This reference line may suitably be the base line of type-written material which is constant regardless of the density of characters having extending portions. The base line is the line which runs along the bottom of all letters without descending portions, as shown in FIGURE 5.

The invention may be more fully understood by the following description of the drawings wherein like numbers designate like parts. The photocomposition corrector consists of a base 15 having a table area 16 and a raised flat supporting surface 17, the base suitably being supported by legs 18. Affixed to the base by screws 21 is a side guide 22 for marginally aligning a piece of copy with respect to a cutting edge or line 23 at the edge of the raised surface 17. Any type of standard cutting element, not shown, such as a circular cutting wheel or shear-type cutter, may be used to run along this fixed cutting guide to cut the film, and applicant does not hereby intend to be limited to any specific cutting means.

Attached along one side of the base 15, suitably by brackets 24, is a carriage guide 25 on which is suitably mounted a carriage 26. Surrounding the carriage guide is a spring 27 biasing the carriage in one direction away from the cutting edge 23. A stop plate 28 is provided on the end of carriage suitably secured thereto. The stop plate and carriage are adjustable with respect to the base 15 by means of a set screw 30 threaded through bracket 24 attached to the base of the mechanism, the pin 31 of the screw acting against the stop plate.

Additionally, there is affixed to the base a selector 32 preferably hexagon-shaped in cross-section and rotatably mounted on an axis 33 in the base. The selector has projections 34 on each face of varying height which engage the stop plate 28 acting as predetermined stops for the carriage automatically performing the function of the set screw 30 for positioning the carriage at preselected positions with respect to the cutting edge of the mechanism. The selector can be removed if desired to permit the carriage to travel the full length of the carriage guide.

Mounted on the carriage at 35 is an indicating means and preferably a micrometer indicator 36 having a plunger 37 and a dial 38, the plunger operating against a stop 40 affixed to the frame of the mechanism at 41. The carriage includes brackets 42 suitably secured to the carriage by screws 43. Spring-loaded ball plunger set screws 44 are mounted on an arm of the bracket 42 in opposition to points 45 affixed to the carriage itself. An indexing plate 46 having metallic reinforcement end plates 47 and 48 suitably secured thereto is secured to the carriage by the set screws 44. On plate 48 are indents 50 acting as seats for the points 45 on the carriage.

On the indexing plate is at least one index line 51 that is aligned with the reference line of the typewritten material, as more fully described below. It is important that this line always be in parallel relationship to the cutting edge 23 as the plate moves with the carriage.

The spring-biased ball plunger screws permit the indexing plate to hinge with respect to the carriage while maintaining it and the index line in the proper position with respect to the cutting edge by the points acting in the seats 50.

The indexing plate may have one or a plurality of index lines 51 to encompass a wide variety of type sizes without requiring more than moderate movements of the carriage. The lines may be either scribed onto the under surface of the indexing plate, or may be optically projected onto the surface of the copy by a means not shown. The indexing plate is suitably transparent and includes an access window 52 to permit the operator of the device to move the copy with respect to the indexing plate.

In operation the carriage is allowed to move under action of the spring either by rotating the selector to the desired position or by adjusting the set screw 30 until the indicator shows the distance desired between the index line 51 and the cutting edge 23.

The micrometer is preferably positioned on the carriage so that it reads zero when the index line is aligned with the cutting edge 23 and accurately reads the increasing distance between the two as the carriage moves under the action of the spring 27. This distance is pre-selected depending upon the size and style of the type material on the photocomposition and hence the position of the cut desired, so that when the reference line such as the base line of the type material is aligned under the index line, the cutting line 23 will fall exactly between that line of type and the one immediately above it.

After the micrometer has been adjusted to the desired distance, the copy is placed under the indexing plate, positioned against the marginal guide and slid up until the base line of the line sought to be deleted is aligned with the index line. Suitable hand pressure is then applied to the indexing plate 46 to secure the copy with respect to the platform 17. Any suitable cutting element such as a self-sharpening rotary cutter is then run down the cutting edge 23 making the desired cut in the copy. Thus, for a given type size and style, a setting on the micrometer can be used which will cause the cut to fall exactly between the ascenders and descenders of the lines of type, and will assure that the cut lines will always be parallel so that inserted lines of type will be parallel and properly spaced from the adjacent lines.

Alternatively, the device can be set up, when it is not known what the micrometer setting should be, by first aligning the copy at the place it is desired to make the cut with respect to the cutting edge or with respect to the index line with the micrometer at the zero position. Then the stop screw 30 is adjusted until the index line is accurately located at the base line of this line of type. Having now determined the proper distance that the base line should be from the cut line, all subsequent cuts of the same size and style of type material can be reproduceably spaced the same distance from the base line.

Two cuts are necessary in order to remove a line of typewritten material. Subsequent to the first cut, the work is then slid forward with respect to the indexing plate by engaging the work through the access window 52 in the indexing plate 46 until the reference line of the next succeeding line of type is aligned with the index line 51. The cutting edge will then be exactly between that line of type and the one above it which was previously used as a reference line. This line of type can then be removed and a corrected or new one inserted therein. Instead of a single line of type a whole group of lines can be deleted merely by making reference to the line following the last line to be corrected.

Instead of advancing and realigning the work by sight after the initial cut and especially when the last line of a paragraph is to be removed and no proper reference line can be used, a platform 60, suitably having a gripping surface 61 affixed thereto may be provided flush with the surface 17 of the mechanism. This automatically repositions the copy at the desired cut width. The platform is slidably mounted with respect to the base for movement perpendicular to the cutting line 23 and is positioned immediately below the access window 52 within an opening 62 in the surface 17 of the device.

Secured to the body of the platform by screws 63 are guiding plates 64, the platform being supported and guided by nylon rods 65 located along the bottom of the opening 62. The platform and guiding mechanism is confined within the opening by a bottom plate 66 suitably secured to the base 15 by screw 67. Thus, the platform is guided laterally without any appreciable rotational motion and moves parallel to the marginal guide line 22.

Extending longitudinally through the middle of the platform is a hole 70 through which passes a pin 71 anchored to the plate 66 by a bracket 72. A helical compression spring 73 surrounds the shaft 71 acting between the bracket 72 and a stop plate 74 secured to the opposite end of the platform by screws 75. This spring urges the platform away from the cutting edge 23 and toward the far end 76 of the opening 62.

The range of travel or stroke of the platform is controlled by an adjustable stop means comprising an arm 77 pivoted at 78 to the base of the mechanism, having a follower roller 80 rotatably secured to one end of the arm engaging the plate 74 attached to the edge of the platform. At the opposite end of the arm and on the other side of the pivot 78 are detents 81 adapted to seat within a plurality of slots 82 on a scale 83 suitably secured to the mechanism. A shaft 84 extends upwardly from the arm through an arc slot 85 in a plate 86 on the surface of the device. Threaded onto the end of the shaft 84 is a lock nut 88 adapted to lock the detents of the arm into the desired slots.

The slots 82 in the scale 83 correspond to the desired length of stroke or distance of travel of the platform. When the detents are in the slot closest to the cutting edge, the stroke will be at a maximum as the roller 89 will be in the farthest position away from the cutting edge. Movement of the arm to the opposite end of the scale limits the stroke to a minimum. Since the platform is held against the stop plate 74 by the spring 73, this will be the beginning point of the stroke, adjustable by the above-described mechanism. The pin 71 contacts the facing surface of the stop plate 74 and acts as a fixed forward stop for the end of the stroke of the platform.

In operation and after the first cut has been made in the copy, the copy is advanced the selected distance by pressing through the access opening 52 in the indexing plate 46 and pushing the work against the gripping surface 61 of the platform. The platform and copy are then pushed in opposition to the spring 73 toward the cutting edge 23 until it is limited by the stop at the end of its stroke, the stroke being set by the scale 83 depending upon the body size of the type being used. This automatically permits the work to be advanced for the second cut without having to realign the index line with respect to the reference line of a subsequent line of type. If a plurality of lines are to be removed, the platform can be advanced and released successively until the last line to be removed is reached.

While the invention is applicable to copy such as reproduction proofs or other impact produced copy, produced by any means, it is especially applicable to type material that has been produced by photographic means and on film or paper base material, both of which can easily be corrected by the device of this invention.

In view of my invention and disclosure, variations and modifications to meet individual whim or particular need will doubtless become evident to others skilled in the art, to obtain all or part of the benefits of my invention without copying the apparatus shown, and I, therefore, claim all such insofar as they fall within the reasonable spirit and scope of my claims.

Having thus described by invention, what I claim as new and desire to secure by Letters Patent is:

1. A workholder for photocomposition corrections in work having textual material arranged in lines, each of which has a reference or base line, comprising in combination, a base having a supporting surface for the work to be corrected, a shear line on the base on which shearing may be conducted, a transparent indexing plate, means for mounting the indexing plate slidably toward the shear line, an index line on the surface of the indexing plate adjoining the base, visible with respect to the lines of textual material on the work, the index line being parallel to the shear line and adapted to be placed with respect to the shear line when the work is on the base beneath the indexing plate with the reference line on the index line and the interline space between the textual material of different lines on the shear line, and micrometer means mounted on the base for accurately adjusting the relative distance between the index line and the shear line so that the shear line is opposite the interline space for diferent textual material.

2. A workholder according to claim 1, wherein the mounting means comprises a plurality of fixed points adapted to seat against indents on one side of the indexing plate, the points held therein by spring-biased elements operating against the opposite side of the plate.

3. A workholder for photocomposition carrying lines of textural material having a reference line comprising in combination, a base having a supporting surface for the work to be corrected, a shear line along the base, an indexing plate having an index line thereon visible with respect to the lines of textual material on the work, the index line being parallel to the shear line and adapted to be aligned with the reference line of the textual material, means for accurately adjusting the relative distance between the index line and the shear line so that the line of shear falls between and parallel to the lines of textual material, a movable platform slidably mounted on the base flush with the supporting surface and positioned beneath the work to be corrected, whereby movement of the platform moves the work toward and away from the shear line and means for limiting the range of travel of the platform.

4. A corrector according to claim 3, wherein the platform is engageable by hand for sliding movement relative to the shear line.

5. A corrector according to claim 3, including spring means biasing the platform away from the shear line, wherein the limiting means for the platform comprises fixed stop means limiting the distance of travel in opposition to the spring, and adjustable stop means limiting the distance of travel under the spring.

6. A corrector according to claim 5, wherein the adjustable stop means comprises a pivotable arm acting against the platform in opposition to the spring at one end and lockably engageable at the other end opposite the pivot with a series of locating points spaced at intervals along a scale.

7. A workholder according to claim 1, comprising in combination, a movable platform slidably mounted on the base flush with the supporting surface and positioned beneath the work, there being an opening in the indexing plate for access to the work, whereby movement of the platform by the hand holding the work against the platform moves the work toward and away from the shear line, and means for limiting the range of travel of the platform.

8. A workholder according to claim 7, including spring means biasing the platform away from the shear line, wherein the limiting means for the platform comprises fixed stop means limiting the distance of travel in operation to the spring, and adjustment stop means limiting the distance of travel under the spring.

References Cited

UNITED STATES PATENTS

| | | | |
|---|---|---|---|
| 790,695 | 5/1905 | Lillard | 83—522 |
| 2,304,262 | 12/1942 | Lund | 269—303 X |
| 2,737,239 | 3/1956 | Freund | 83—522 X |
| 2,994,964 | 8/1961 | Moffet | 33—184.5 |
| 3,065,547 | 11/1962 | Blodgett | 33—184.5 X |

ROBERT C. RIORDON, *Primary Examiner.*

DAVID R. MELTON, *Assistant Examiner.*